United States Patent
Ruzzier et al.

(10) Patent No.: US 8,333,090 B2
(45) Date of Patent: Dec. 18, 2012

(54) PROCESS FOR MANUFACTURING A LOW-ATTENUATION OPTICAL FIBER

(75) Inventors: Marco Ruzzier, Milan (IT); Cristiano Ruocchio, Naples (IT); Franco Cocchini, Battipaglia (IT); Antonio Adigrat, Battipaglia (IT)

(73) Assignee: Prysmian S.p.A., Milan (IT)

( * ) Notice: Subject to any disclaimer, the term of this patent is extended or adjusted under 35 U.S.C. 154(b) by 416 days.

(21) Appl. No.: 12/311,804

(22) PCT Filed: Oct. 17, 2006

(86) PCT No.: PCT/EP2006/067505
§ 371 (c)(1),
(2), (4) Date: Jun. 7, 2010

(87) PCT Pub. No.: WO2008/046447
PCT Pub. Date: Apr. 24, 2008

(65) Prior Publication Data
US 2010/0236292 A1    Sep. 23, 2010

(51) Int. Cl.
*C03B 37/07* (2006.01)
(52) U.S. Cl. .......................................... 65/377; 65/414
(58) Field of Classification Search .................. 65/377
See application file for complete search history.

(56) References Cited

U.S. PATENT DOCUMENTS

| | | |
|---|---|---|
| 5,406,374 A | 4/1995 | Shimada et al. |
| 2001/0054302 A1 | 12/2001 | Terashima et al. |
| 2002/0100295 A1 | 8/2002 | Terashima et al. |
| 2003/0024278 A1* | 2/2003 | Berkey et al. .................. 65/428 |
| 2006/0086148 A1 | 4/2006 | Mileo et al. |

FOREIGN PATENT DOCUMENTS

| | | |
|---|---|---|
| EP | 0 484 035 A1 | 5/1992 |
| JP | 57-200238 | 12/1982 |
| JP | 59-207849 | 11/1984 |
| JP | 10-167744 | 6/1998 |
| WO | WO 2004/018373 A1 | 3/2004 |
| WO | WO 2005/063638 A1 | 7/2005 |

* cited by examiner

*Primary Examiner* — Queenie Dehghan
(74) *Attorney, Agent, or Firm* — Finnegan, Henderson, Farabow, Garrett & Dunner, L.L.P.

(57) ABSTRACT

A process for manufacturing an optical fiber, includes the steps of: a) producing a soot core preform by depositing a core material on a substrate; b) removing the substrate from the soot preform leaving an axial cavity along the longitudinal axis of the soot core preform; (c) drying and consolidating the soot core preform so as to obtain a glass core preform having an axial hole corresponding to the axial cavity; d) reducing a diameter of the axial hole; and e) stretching the glass core preform so as to substantially close the axial hole, wherein the process further includes the step of measuring at least one geometric characteristic of the axial hole of the glass core preform.

30 Claims, 5 Drawing Sheets

PROCESS FOR MANUFACTURING A LOW-ATTENUATION OPTICAL FIBER

CROSS REFERENCE TO RELATED APPLICATION

This application is a national phase application based on PCT/EP2006/067505, filed Oct. 17, 2006, the content of which is incorporated herein by reference.

TECHNICAL FIELD

The present invention relates to an optical fiber manufacturing process.

In particular, the present invention relates to a process for manufacturing an optical fiber which comprises the step of measuring at least one geometric characteristic of a glass core preform.

More in particular, the present invention relates to a process for manufacturing an optical fiber which comprises the step of measuring at least one geometric characteristic of an axial hole of a glass core preform.

Furthermore, the present invention relates to a method for measuring at least one geometric characteristic of an axial hole of a glass core preform, specifically in a process for manufacturing an optical fiber.

BACKGROUND ART

Telecommunication optical systems use optical fibers as physical means for transporting information through optical signals. An optical signal, while propagating in an optical fiber, undergoes several changes due to various effects occurring into the fiber, such as attenuation, dispersion, non linear effects or the like. In particular, due to attenuation, an optical signal propagating along an optical fiber gradually reduces its power.

Attenuation in optical fibers varies according to optical signal wavelength. For instance, conventional telecommunication silica-based optical fibers show a particularly reduced attenuation in wavelength ranges which are called "transmission windows". In particular, the so-called "third transmission window" comprises wavelengths between about 1520 nm and 1620 nm, and it is typically used in the telecommunication optical systems, such as WDM systems ("Wavelength Division Multiplexing").

An optical fiber is an optical waveguide which is generally provided with a circular cross-section, the optical fiber comprising a circular core and an annular cladding around the core. An optical fiber generally comprises dopants in the core and/or in the cladding around the core. For instance, in telecommunication silica-based optical fibers, germanium-doped silica is generally present in the core as well as in the cladding.

Attenuation in optical fibers is mainly due to impurities or defects into the core. For instance, hydroxyl radicals (OH) or water molecules, which are trapped into the core of a silica-based optical fiber upon production, induce an attenuation peak with a maximum at about 1383 nm and which extends its influence in the range from about 1330 nm to 1470 nm.

One of the most common techniques for manufacturing a telecommunication silica-based optical fiber is the "Outside Vapor Deposition" (OVD) technique. Such a technique comprises a core deposition step wherein a core layer made of a porous material comprising silica and germanium is laid down on a cylindrical substrate (for instance, a rod). After the core deposition, the substrate is removed, thus obtaining a cylindrical body which is typically termed "soot core preform" and which has an axial hole extending in the axial direction, i.e. along the preform longitudinal axis. Then, the soot core preform is dried so that possible water molecules and hydroxyl radicals which are formed on the walls (in particular, on the inner surface of the axial hole) during the deposition step are removed. Then, the soot core preform is consolidated, i.e. it is heated to a temperature such that the porous material sinters and becomes glass, thereby obtaining the so-called "glass core preform". Successively, the glass core preform is stretched so that its length increases and its diameter reduces. During the stretching step the axial hole collapses and closes, thus obtaining a so-called "core cane". A cladding deposition step is successively carried out, wherein a cladding layer made of porous material comprising silica is laid down onto the core cane. Then, the cladding layer is consolidated, thus obtaining a "fiber preform" which is subjected to a drawing step so as to obtain the desired optical fiber.

Although, as mentioned above, the OVD technique comprises a drying step, the optical fiber core that is produced according to the OVD technique usually comprises a non negligible amount of hydroxyl radicals and water molecules, said amount inducing the above cited attenuation peak between 1330 nm and 1470 nm, with a maximum at about 1383 nm.

Different factors contribute to the presence of hydroxyl radicals and/or water molecules on the inner wall of a soot core preform.

One cause, for instance, is due to the fact that the furnace for performing the drying and consolidation steps, said steps allowing to obtain a glass core preform, is different from the furnace for stretching the glass core preform. Therefore, the glass core preform is generally moved from the drying and consolidating furnace to the stretching furnace and thus the glass core preform is exposed to the ambient atmosphere, fact which causes rewetting of the inner surface of the axial hole of the soot core preform.

Further possible causes can also reside, for instance, in an incomplete removal of hydroxyl radicals and/or water molecules during the drying step, the use of non-fully dehydrated gases during the process and the ingress of humidity through the muffle which surrounds the furnace.

Recently, due to development of telecommunication optical systems with increased capacity, enlarging the third transmission windows towards lower wavelengths is becoming desirable. Therefore, recently, an interest is growing in providing optical fibers with a particularly reduced amount of water molecules and hydroxyl radicals so that the attenuation peak between 1330 nm and 1470 nm is reduced and the third transmission window can be enlarged to this wavelength range.

Document WO 2005/063638 A1—in the name of the same Applicant—discloses a process for producing low-attenuation optical fibers, wherein the step of drying and consolidating comprises reducing the diameter of the axial hole, and the step of stretching comprises closing the axial hole. According to this document, the glass core preform is not extracted from the furnace after the drying and consolidation steps, and is subjected to a further thermal treatment inside the furnace for partial closure of the axial hole, i.e. for reducing the diameter of the axial hole without determining a complete closure thereof. According to document WO 2005/063638 A1 the diameter of the axial hole at the end of this further thermal treatment is preferably lower than about 0.4 mm and greater than about 0.05 mm. Indeed, a diameter larger that 0.4 mm could result in a non negligible OH contamination after the extraction of the preform from the furnace, while a diameter lower than 0.05 mm could induce a premature closure of the hole, in particular during the successive stretching step, so that bubbles and voids are inevitably formed inside the core.

The Applicant has noticed that, according to the process disclosed by document WO 2005/063638 A1, in the case the further thermal treatment mentioned above generates glass core preforms with an axial hole diameter higher than the above mentioned maximum value or lower than the above mentioned minimum value, the operator responsible for the optical fiber manufacturing process becomes aware of the need of adjusting the process parameters (e.g. temperature, pressure, time) which regulate the further thermal treatment only after the overall process is completed and the optical fiber is obtained and correct functioning thereof is tested. In fact, only at this final stage it is possible to measure the optical features of the optical fibre (in particular, the attenuation value between 1330 nm and 1470 nm) and, on the basis of the obtained results, to evaluate if the optical fiber has to be discarded or not. Moreover, since the whole optical fibre manufacturing process generally requires several days to be completed, the operator becomes aware that at least one of the process parameters needs to be modified at a very late stage, i.e. when the optical fiber has already been produced.

Methods for performing measurement of geometric characteristics of a preform during the process for manufacturing an optical fiber are already known in the art and described, for instance, in the following documents.

Document WO 2004/018373 describes a process and an apparatus for elongating an optical fiber preform, comprising: heating the preform so as to soften one region thereof; elongating the preform by submitting the preform to a traction; determining, during the step of elongating, the preform diameter in at least one measuring point along the preform; and controlling the step of elongating on the basis of the determined diameter. During the step of elongating, at least a geometric parameter of the preform is measured, and the position of said diameter measuring point is controlled according to the measured geometric parameter. Measuring at least a geometric parameter of the preform may comprise determining the profile of at least a portion of the softened region, e.g. an image of the neck region profile.

JP 57200238 discloses a method to make the outer diameter of a drawn glass rod uniform, by scanning and measuring the outer diameter of the heat-drawn part of the glass rod, detecting the point to complete the deformation of the rod, and controlling the drawing so as to get the outer diameter of the point within a preset range. The outer profile of the glass rod at the heating and drawing zone is detected with an ITV camera, and the outer diameters d1 . . . dn at the positions y1 . . . yn along the longitudinal direction are digitized with the signal processor and transmitted to an outer diameter processor. When the outer diameter at the point to complete the deformation is deviated out of a permissible range, a predetermined output signal is transmitted from the outer diameter processor to an outer diameter controlling device which controls the outer diameter by adjusting the pulling rate of the chuck holding the glass rod.

JP 59207849 discloses a method to make the outer diameter of an optical fiber after drawing uniform in the longer direction, by setting a television camera to take a photograph of the drawn part of the parent material of optical fiber and a television provided with a width analyzer for controlling the dimension of the outer periphery of the drawn part by a revising signal.

U.S. Pat. No. 5,406,374 discloses an apparatus for accurately, thoroughly and automatically inspecting an optical fiber preform for the presence of bubbles and/or inclusions. The inspection apparatus comprises a light source for making light rays incident upon an end face of a rod-like optical fiber preform, a video camera for photographing the side face of the optical fiber preform and an image-processing circuit for discriminating and detecting bubbles and/or inclusions present in the preform through processing of image signals outputted from the video camera and inputted to the circuit.

JP 10167744 describes an apparatus for optical fiber preform member of synthetic quartz, mounted with a detector for bubbles left inside a preform as an attachment so as to afford the labor saving and automation of drawing process, dispense with interoperator variance, and effective quality control of bubble detection. The drawing apparatus has an ingot which is drawn under revolution and the image of the resultant drawn preform is taken by two CCD cameras. In this case, the ingot fixed on a rotational chuck on the upper part of a hot oven is inserted into the oven and drawn into the preform of a given diameter at a controlled rate by a drawing drive unit. The drawing rate is controlled at a constant level through measuring preform diameter both being in molten state and after hardened using outer diameter measuring devices installed midway and underside of the hot oven, respectively. The image data taken by the CCD cameras are used for detecting bubble positions through an image processor and an arithmetic computer and the positions detected are marked.

The Applicant has observed that the axial hole diameter of a glass core preform, said preform being obtained from an OVD process which comprises a thermal treatment step for reducing the preform axial hole diameter, can remarkably vary in glass core preforms that are obtained from said process.

Moreover, the Applicant has observed that the axial hole diameter of a glass core preform, which is obtained from said OVD process, can remarkably vary within the same glass core preform so that different portions of the same glass core preform, along the longitudinal development thereof, can present different axial hole diameter values.

The Applicant has thus faced the problem of providing a glass core preform whose axial hole diameter, at the end of the thermal treatment step of the OVD process, is kept within a predetermined range so as to avoid OH contamination of the glass core preform as well as a premature closure of the axial hole thereof, said premature closing possibly causing the formation of bubbles and voids that are trapped within the glass core preform, said predetermined range being preferably lower than about 0.4 mm and greater than about 0.05 mm.

SUMMARY OF THE INVENTION

The Applicant has found that the OH contamination of a glass core preform as well as the premature closure of the axial hole thereof can be avoided, or at least remarkably reduced, by carrying out a non-destructive control of the axial hole of the glass core preform.

In particular, the Applicant has found that, by providing the optical fiber manufacturing process with a step of measuring at least one geometric characteristic of the glass core preform axial hole, it is possible to check the quality of 100% produced glass core preforms so that defected preforms can be discarded, or possibly re-processed, at a very early stage of the manufacturing process, thereby avoiding to discard the optical fibers at the end of the manufacturing process thereof.

Therefore, according to a first aspect, the present invention relates to a process for manufacturing an optical fiber, the process comprising the steps of:

producing a soot core preform by depositing a core material on a substrate;

removing the substrate from the soot core preform leaving an axial cavity along the longitudinal axis of the soot core preform;

drying and consolidating the soot core preform so as to obtain a glass core preform having an axial hole corresponding to said axial cavity;

reducing a diameter of the axial hole; and stretching the glass core preform so as to substantially close the axial hole, wherein the method further comprises the step of measuring at least one geometric characteristic of the axial hole of the glass core preform.

According to the present invention the term "axial hole" is used to indicate the hole of the glass core preform which centrally extends along the longitudinal axis of the glass core preform.

According to the present invention, the measuring step of the optical fiber manufacturing process comprises the step of measuring at least one geometric characteristic of the glass core preform axial hole.

Preferably, the measured geometric characteristic is the diameter of the glass core preform axial hole. Alternatively, the measured geometric characteristic is the axis profile of the axial hole of the glass core preform, said axis profile being plotted along the length of the glass core preform.

According to the present invention, the at least one geometric characteristic is measured along the whole length (axis) of the glass core preform.

According to the present invention, the measuring step of the optical fiber manufacturing process is carried out before the stretching step. In detail, the measuring step is carried out after the step of reducing the axial hole diameter, i.e. at the end of the thermal treatment step which is performed for reducing the preform axial hole diameter.

The measuring step of the manufacturing process of the present invention is generally performed while the glass core preform is positioned outside the furnace where the drying and consolidating steps are carried out. Alternatively, the measuring step is performed while the glass core preform is positioned inside said furnace.

According to the present invention, the measuring step comprises the step of digitally acquiring at least one image of the whole glass core preform. Moreover, the acquiring step comprises the step of acquiring a first image of the whole glass core preform, said image having a first aspect ratio. The aspect ratio of the preform image is the ratio between the preform image size taken along the x direction and the preform image size taken along the y direction, wherein the y direction corresponds to the preform longitudinal axis and the x direction is perpendicular to the y direction.

According to the present invention, the acquiring step comprises the step of optically compressing the first image taken along the y direction so as to obtain a second image having a second aspect ratio which is different from the first aspect ratio. According to the present invention the term "optically compressing" indicates that the first image of the glass core preform is compressed by means of an optical system. Preferably, the first image is optically compressed by means of an anamorphic optical system that produces a vertical magnification which is about 4 times less than a horizontal magnification of the glass core preform.

Moreover, the process comprises the step of acquiring said second image which is processed in order to measure the desired geometric characteristic of the glass core preform axial hole.

The Applicant has found that the measuring step can be performed by acquiring an image of the glass core preform C, and thus of the preform axial hole, and by obtaining the at least one desired geometric characteristic by processing said image. In the case a single image is acquired, said image corresponds to and shows the whole length of the glass core preform.

Preferably, the Applicant has found that two images of the whole glass core preform C, taken by rotating the preform of an angle of 45° to 120°, are generally suitable for obtaining a precise measure in a relatively short time. In the case two images are taken, the preform is preferably rotated of 90°.

Alternatively, more than two measures, e.g. 3 measures, are preferred when a complete geometrical definition of the glass core preform (and thus of the glass core preform axial hole) is desired. Also in this case, each single image shows the whole length of the glass core preform and the images are taken by rotating the preform of a predetermined angle.

Therefore, the manufacturing process according to the present invention can comprise the step of repeating the acquiring step more than one time so that at least two different images of the whole glass core preform, and specifically of the axial hole of the glass core preform, can be obtained.

For instance, in order to safely carrying out the measuring step mentioned above, so that any possible anisotropy of the glass core preform and/or of the axial hole thereof can be detected (e.g. the ellipticity of the preform axial hole), at least three distinct images of the whole glass core preform, and specifically of the axial hole thereof, are acquired. Preferably, an image of the glass core preform is acquired after each 120° rotation angle of the glass core preform around the longitudinal axis thereof. In such a way any possible irregularities in the symmetry of the glass core preform and/or of the glass core preform axial hole can be advantageously detected and taken into consideration for evaluating the quality of the glass core preform.

According to a second aspect, the present invention relates to a method for measuring at least one geometric characteristic of a glass core preform, wherein the method comprises the following steps:

illuminating the glass core preform;

acquiring a first image of the whole glass core preform having a first aspect ratio;

optically compressing the first image in a first direction parallel to a longitudinal axis of the glass core preform so as to obtain a second image having a second aspect ratio different from the first aspect ratio;

acquiring the second image; and processing the second image so as to measure the at least one geometric characteristic.

The image processing technique of the present invention comprises an anamorphic optical system designed to produce a vertical magnification which is about 4 times less than the horizontal magnification so that a one-shot image of the whole preform length is obtained, thereby avoiding multiple scanning of the preform length wherein each scanning provides for the image of only a longitudinal portion of the preform length.

The present invention allows that the geometry of the axial hole (e.g. the hole diameter) of the OVD glass core preform is reliably and quickly measured. In such a way a substantially real-time feedback can be provided to the technical personnel that is responsible for carrying out the optical fiber manufacturing process. In other words, at the end of the drying, consolidation and axial hole diameter reduction steps, according to the present invention the technical personnel is aware whether the glass core preform geometric characteristics are suitable for successively obtaining an optical fiber of good quality. On the contrary, in the case the at least one measured geometric characteristic of the glass core preform is not acceptable, the technical personnel discards the glass core preform—or at least the portion thereof which is not compliant with the desired requisites—and operates on the process parameters (e.g. the initial hole diameter, the temperature of the hot zone, the pressure inside the axial hole, the pressure outside the preform, the time of traveling of the preform into the furnace hot zone) in order to obtain the desired value for the at least one geometric characteristic.

BRIEF DESCRIPTION OF THE DRAWINGS

The present invention will be better understood by reading the following detailed description, given by way of example and not of limitation, to be read with the accompanying drawings, wherein.

DETAILED DESCRIPTION OF PREFERRED EMBODIMENTS OF THE INVENTION

Figure 1:
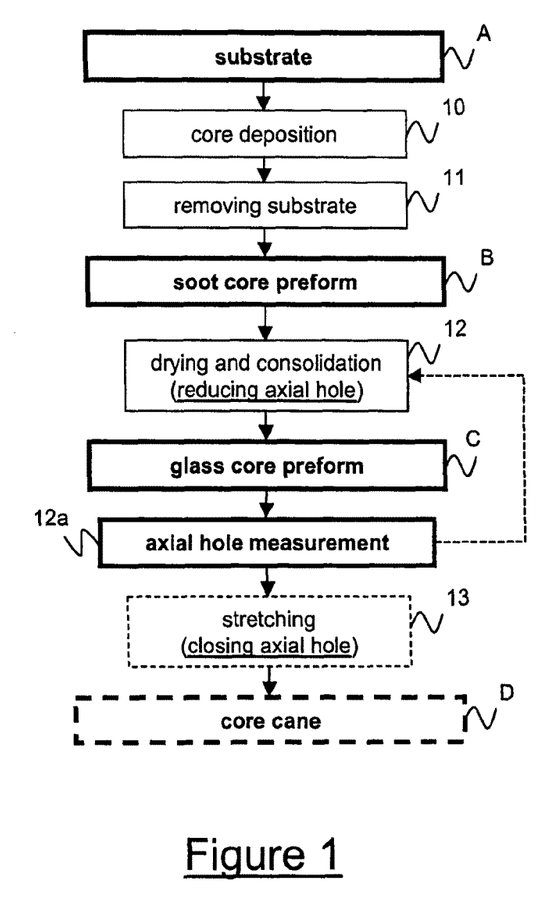
FIG. 1 schematically shows a flow chart of the steps for providing a core cane in a process for producing an optical fiber.

FIG. 1 schematically shows a flow chart including the steps for providing a core cane in a process for manufacturing an optical fiber, specifically a low-attenuation optical fiber. Said process comprises a core deposition step (step 10) wherein a core layer is laid down on a cylindrical substrate A. During the core deposition step a plurality of chemical substances, typically comprising oxides of silica and germanium, is deposited on the substrate A by using an OVD apparatus. The substrate is typically a rod. The rod is preferably made from glass or Alumina. The substances deposited onto the substrate form the core and the inner cladding portion. During the core deposition step, the reactant flow may be varied (in particular, germanium concentration is typically decreased in time) so as to obtain a predetermined refractive index profile. In particular, by controlling the reactant flow it is possible to obtain a desired ratio between core radius and external radius of the core preform. The ratio between the inner cladding radius and the external radius is tuned to prevent contamination of the core and of the inner cladding region due to diffusion of OH from the overcladding region. The so-obtained porous material has a typical density of about 0.5 gr/cm$^3$, said density being much lower than the glass density, as it will be shown herein after.

After the core deposition step, the substrate is removed (step 11), thus obtaining a soot core preform B which has an axial cavity extending along the axial direction, i.e. along the longitudinal development of the preform.

Then, the soot core preform B is dried and consolidated (step 12) by means of a drying and consolidating apparatus which comprises a furnace and a preform roto-translation device. The furnace has an upper zone and a lower zone (also called "hot zone"). The soot core preform B is provided at one end with a handle. The preform roto-translation device is adapted to grip the preform handle and to move the preform B vertically into the furnace, from a position outside the furnace to a position within the upper zone of the furnace and then to a position within the lower zone (hot zone) of the furnace. During drying, the soot core preform is positioned into the upper zone of the furnace, while drying gases (typically containing $Cl_2$ and an inert gas such as He) are fed into the preform axial cavity in order to remove hydroxyl radicals and water molecules. The temperature of the upper zone during drying is preferably between 950° C. and 1050° C.

Then, the preform B is moved towards the hot zone for consolidation, preferably at a constant speed (for instance 5 mm/min). As the lower end of the preform B enters the furnace hot zone, the soot core preform starts consolidating. The preform is moved until it is completely positioned into the hot zone. During consolidation, the furnace is still fed with an inert gas (e.g. He). The temperature of the hot zone during consolidation may be, for example, at about 1420° C. At this temperature, the porous material sinters and becomes glass (with an increased density of about 2.2 gr/cm$^3$), so that the soot core preform B becomes a glass core preform C.

After drying and consolidation, the diameter of the soot core preform axial cavity (said diameter being, for instance, of about 10 mm) is remarkably reduced and a glass core preform axial hole is obtained. The axial hole of the glass core preform C corresponds to the axial cavity of the soot core preform B. In fact, the longitudinal axis of the axial hole substantially coincides with the longitudinal axis of the axial cavity. The diameter of the axial hole is remarkably lower than the diameter of the axial cavity. The diameter of the axial hole is typically comprised between 3 mm and 4 mm.

During step 12, after drying and consolidation the glass core preform is subjected to a further thermal treatment in the same furnace in order to obtain a partial closure of the axial hole. In detail, the glass core preform is raised to an intermediate position between the upper zone and the lower zone. Then, vacuum is created inside the axial hole by means of a vacuum pump which extracts the gas from the axial hole so as to reduce the pressure in the hole down to a value preferably lower than 200 mBar, more preferably lower than 100 mBar. At the same time, the temperature of the hot zone is raised to a value preferably between 1495° C. and 1540° C., more preferably between 1510° C. and 1530° C., for example 1520° C. After stabilization of the temperature into the hot zone, the glass core preform is positioned again into the hot zone, which is still preferably fed with an inert gas (e.g. He). In the hot zone, the glass softens and the axial hole undergoes a diameter reduction due to the obtained vacuum and the surface tension of the glass. The final hole diameter that is reached at the end of the further thermal treatment generally depends on the initial hole diameter, the temperature of the hot zone, the pressure inside the axial hole, the pressure outside the preform as well as the time of traveling of the preform into the hot zone.

Successively, the glass core preform C is stretched (step 13) in a redraw furnace, so that its length increases and its diameter is reduced. During stretching, the axial hole collapses and substantially closes, thus obtaining core cane D. Preferably, the axial hole collapses to completely close so that no void areas are present inside the core cane D.

Successive steps of the OVD technique are not shown in FIG. 1, since they are not relevant to the present description.

According to the present invention, after step 12 of drying and consolidating, said step 12 including also the step of reducing the axial hole diameter of the glass core preform C, a further step 12a is provided wherein at least one geometric characteristic of the glass core preform C is measured. Preferably, the further step 12a comprises the steps of measuring at least one geometric characteristic of the axial hole of the glass core preform C.

In particular, according to a preferred embodiment of the present invention, the further step 12a comprises measuring the axial hole diameter of the glass core preform C. Therefore, according to the present invention, it is advantageously possible to check after the drying and consolidating step 12 whether the axial hole diameter of the glass core preform C is comprised within a predetermined range value, said range being preferably lower than about 0.4 mm and greater than about 0.05 mm.

The present invention advantageously allows to discard any glass core preform C or portions thereof whose axial hole diameter is not compliant with the desired requirements and only the glass core preforms C—whose axial hole diameter is compliant with said desired and requested requirements—are stretched (step 13) in order to obtain a core cane D. This is schematically shown in FIG. 1 wherein step 13 and the core cane D are represented through dashed lines in order to highlight that, after step 12a has been carried out, it is possible to decide whether performing or not the stretching step 13.

It can be noted that, according to the present invention, by discarding the glass core preforms which are not compliant with the requested characteristic values, it is possible to avoid that the manufacturing process steps following the core cane production step are performed on glass core preforms which could result in optical fibers of low quality, e.g. optical fibres whose attenuation value between 1330 nm and 1470 nm is not acceptable.

Furthermore, it can also be noted that the measuring step 12a according to the present invention allows that a substantially real-time feedback can be provided to the technical personnel responsible for carrying out the optical fiber manufacturing process. In other words, at the end of the drying, consolidation and axial hole diameter reduction step (step 12, as shown in FIG. 1), according to the present invention the technical personnel is aware whether the glass core preform geometric characteristics (e.g. the axial hole diameter of the glass core preform) are suitable for obtaining an optical fiber of good quality. In the case the at least one measured geometric characteristic of the glass core preform is not acceptable (e.g. the axial hole diameter is not comprised within a predetermined range value, said range being preferably lower than about 0.4 mm and greater than about 0.05 mm), the technical personnel can decide to discard the glass core preform or at least the portion thereof which is not compliant with the desired requisites. Moreover, on the basis of the measured values of said at least one geometric characteristic along the longitudinal axis of the glass core preform, the technical personnel can operate on the process parameters (e.g. the initial hole diameter, the temperature of the hot zone, the pressure inside the axial hole, the pressure outside the preform, the time of traveling of the preform into the furnace hot zone) so as to achieve a desired value for said at least one geometric characteristic.

Moreover, it can be noted that, according to the present invention, the glass core preform—or a portion thereof— which does not comply with the desired requisites can be discarded at a substantially initial stage of the optical fiber manufacturing process, said initial stage being less expensive than the process steps which follow the drying, consolidation and reduction step (step 12 of FIG. 1).

Figure 2:
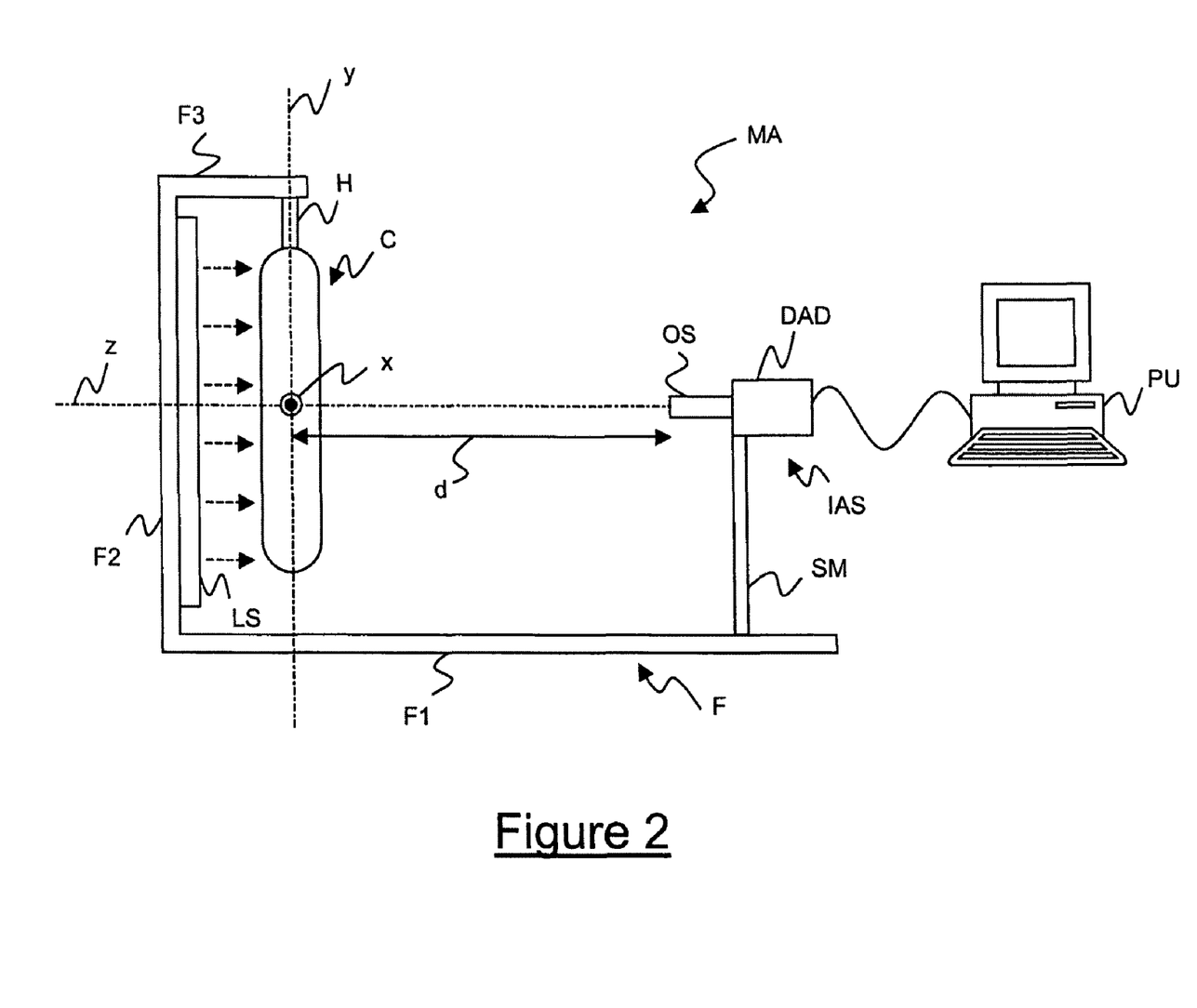
FIG. 2 schematically shows an exemplary measurement apparatus for measuring some geometric characteristics of a glass core preform, said measurement apparatus being employed in the method of FIG. 1.

FIG. 2 schematically shows a measuring apparatus MA for measuring at least one geometric characteristic of a glass core preform C, in particular of the axial hole of the glass core preform. The measuring apparatus MA is used for implementing step 12a of FIG. 1, according to an embodiment of the present invention. The apparatus MA can be used for measuring a geometric characteristic of an elongated transparent body, e.g. a semi-finished product such as a preform or a cane.

The apparatus MA comprises a frame F, an image acquisition system IAS, a processing unit PU and a light source LS.

The frame F provides mechanical stability to the measurement apparatus MA and guarantees the alignment of the glass core preform C, the image acquisition system IAS and the light source LS along a first direction z indicated in FIG. 2. The frame F preferably comprises a base F1, an upright F2 parallel to a second direction y perpendicular to the z direction, and a projecting bar F3 connected to the upright F2 along the z direction. A grasping element H is connected to the projecting bar F3 for engaging the preform handle (not shown in FIG. 2), so that the preform axis is substantially aligned to the y direction. Optionally, the grasping element H and/or the projecting bar F3 are movable along the y direction, so that the position of the glass core preform C along the y direction can be suitably adjusted.

The light source LS is preferably connected to the upright F2. Preferably, the light source LS uniformly illuminates the glass core preform C. For instance, the light source LS may comprise a neon tube placed with its longitudinal axis parallel to the y direction so as to be aligned with the glass core preform C. For uniformly illuminating the whole glass core preform C, the length of the neon tube along the y direction is preferably higher than or equal to the length of the glass core preform C. Preferably, in order to uniformly illuminate the whole glass core preform C, the diameter of the neon tube is higher than the axial hole diameter of the glass core preform. More preferably, the diameter of the neon tube is at least ten times higher than the axial hole diameter of the glass core preform.

According to the preferred embodiment shown in FIG. 2, the light source LS illuminates the glass core preform C along the z direction (as indicated by the dashed arrows).

The measuring apparatus MA further comprises a support member SM that is fixed to the frame F, for instance to the base F1. The support member SM supports the image acquisition system IAS. Preferably, the position of the support member SM is adjustable along the x direction which is perpendicular to the y and the z directions. Preferably, the position of the support member SM is adjustable along the y direction. Preferably, the position of the support member SM is adjustable along the z direction. The position of the support member SM is adjustable so as to ensure the alignment of the glass core preform C with the image acquisition system IAS. The position of the support member SM along the z direction is such that a distance d (indicated in FIG. 2) between the preform axis and the image acquisition system IAS is at least about 1 m, said distance being measured along the axis z.

The frame F shown in FIG. 2 is only exemplary. In FIG. 2 the y direction corresponds to the vertical direction, while x and z directions are horizontal since it is assumed that the glass core preform C is hung up by its handle and thus its longitudinal axis is substantially vertical. Nevertheless, according to further embodiments not shown in the drawings, the glass core preform C may lay horizontally. In this, case, the vertical direction may corresponds either to the x direction or to the y direction.

According to the preferred embodiment shown in FIG. 2, the frame F is adapted to perform the measuring step 12a on "cold" preforms, i.e. on glass core preforms which have been extracted from the furnace after the drying and consolidation step 12 and which are substantially at room temperature.

Alternatively, the measuring step 12a can be performed on "hot" preforms, i.e. on glass core preforms which are still placed within the drying and consolidation furnace, or which have been extracted from the furnace and have not been cooled down to a substantially room temperature. In this case, the frame F needs to be modified in order to be compatible with the high temperatures present inside the furnace. For instance, the frame F requires that heat shields are provided in order to protect the image acquisition system IAS from the very high temperatures (possibly 1000° C. or more) of the furnace. Therefore, preferably the distance d between the glass core preform C and the image acquisition system IAS is at least about 1 m.

The processing unit PU is adapted to process digital data coming from the image acquisition system IAS. In detail, the processing unit preferably comprises a software program for processing the digital data (that are representative of the preform image) and for displaying a graphic interface. Such a graphic interface is used by an operator for managing the various operations of the measuring step 12a of the present invention, as it will be explained in greater detail herein after. Preferably, the processing unit PU is a personal computer. Alternatively, the processing unit PU is a workstation. The software program for implementing data processing and graphic interface may be written in any programming language, such as Matlab, Fortran, C, Java, Python or the like.

The image acquisition system IAS comprises an optical system OS and a digital acquisition device DAD. Preferably, the digital acquisition device DAD is a digital photo camera. Alternatively, the digital acquisition device DAD is a digital video camera. For instance, the Applicant has performed the digital data acquisition by using a digital video camera AVT Dolphin F-201B produced by Allied Vision Technologies of Stadtroda, Germany, having a CCD b/w 1/1.8" sensor with 1620 (horizontal)×1236 (vertical) pixels. Each pixel had a x size dx=4.4 µm and a y size dy=4.4 µm.

The Applicant has noticed that, for measuring with a suitable resolution at least one geometric characteristic of the glass core preform axial hole (e.g. the diameter thereof), the image acquisition system IAS requires a higher resolution along the preform transversal direction, i.e. the direction x in FIG. 2.

However, since the glass core preform C is cylindrical with its axis aligned along the y direction, the preform length along the y direction is typically of several tens of centimeters. This means that the preform length in the y direction is some orders of magnitude higher than the axial hole diameter to be measured in the x direction, the axial hole diameter ranging from a few hundredths of millimeters to a few tenths of millimeters (preferably from 0.05 mm to 0.4 mm).

Therefore, in order to obtain an image of the preform axial hole of very high transversal resolution (notwithstanding the different size magnitude along the y and the x- or z-directions), the Applicant has found that an anamorphic optical system OS—to be placed between the preform C and the digital acquisition device DAD—has to be used. An anamorphic optical system OS is an optical system which modifies the proportions of the image of the glass core preform C before acquisition of the image data by the digital acquisition device DAD. More particularly, the anamorphic optical system OS of the present invention is adapted to increase the aspect ratio of the preform image, i.e. the ratio between the preform image size taken along the x direction and the preform image size taken along the y direction. Therefore, even though the glass core preform has an elongated shape along the y axis (i.e., the preform aspect ratio is much lower than 1), the preform image generated by the optical system OS is modified so as to be reduced in the y dimension and to be increased in the x dimension with respect to the effective y and x dimensions of the glass preform, and especially of the preform axial hole. In such a way that the preform image generated by the anamorphic optical system OS results in being squared with respect to the effective (real) dimensions of the preform. This means that the anamorphic optical system causes the aspect ratio to be increased and, possibly, to be set to a value which is as close as possible to 1. For example, the aspect ratio is between 0.7 and 1.3.

According to the present invention, the anamorphic optical system OS advantageously performs a high resolution image acquisition along the x direction. Moreover, according to the present invention the anamorphic optical system OS advantageously acquires an image of the whole glass core preform C with a single image acquisition.

In other words, according to the present invention an image of very high transversal resolution of the whole preform length (i.e. an image of the preform showing the whole longitudinal length thereof, said image being of very high resolution along the transversal extension of the glass core preform thanks to the anamorphic optical system OS mentioned above) can be obtained so that the desired axial hole geometric characteristic can be measured with a single image acquisition without the need of performing more than one scanning along the preform y direction and thus without the need of combining together the acquired scanned images in order to obtain a complete image of the preform which allows to carry out an exhaustive measurement of the axial hole geometric characteristics.

Therefore, the measuring apparatus MA according to the present invention does not require controllers for modifying the position of the image acquisition system IAS relative to the preform C, which would make the measuring apparatus MA more complex, more expensive and also more subjected to failures. Furthermore, performing more than one scanning would inevitably extend the acquisition time and thus the duration of the measuring step 12a as well as of the whole optical fiber manufacturing process. Moreover, performing more than one scanning would inevitably require a processing unit PU with a more complex software program since the PU should be requested to merge separate images of different portions of the preform C in order to recover a single image of the whole preform C length. Therefore, according to the present invention the anamorphic optical system OS allows the measuring apparatus MA to carry out the measuring step 12a in a quick and very effective way.

Figure 3:
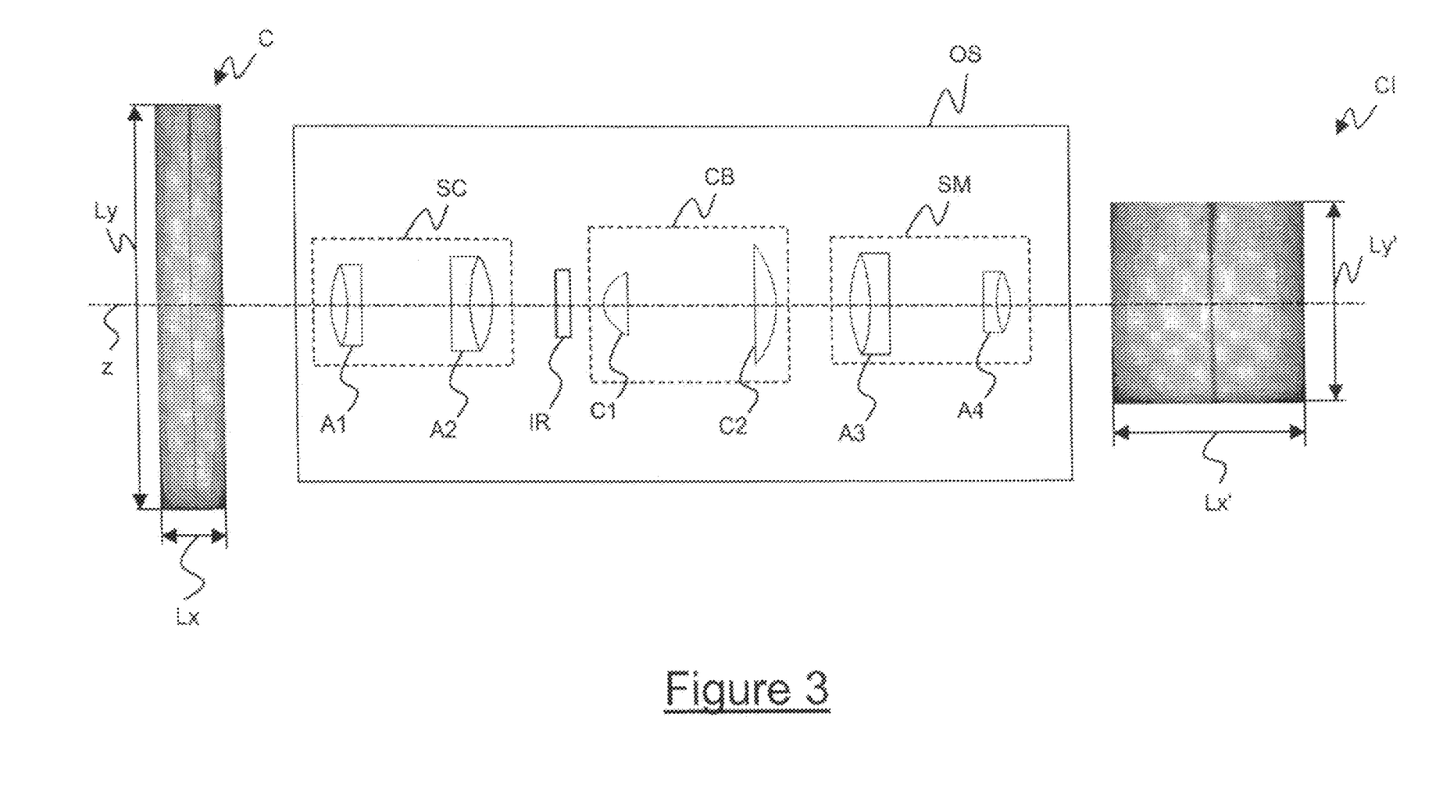
FIG. 3 shows an exemplary optical system which is comprised into the measurement apparatus of FIG. 2.

FIG. 3 shows in greater detail a preferred embodiment of a possible structure of the anamorphic optical system OS of the measuring apparatus MA of FIG. 2.

The optical system shown in FIG. 3 comprises a cascade of a spherical collimator SC, a cylindrical block CB and a spherical magnifier SM.

The spherical collimator SC is adapted to focalize the image of the glass core preform C at infinity. The optical system is arranged so that the distance d between the preform axis and the image acquisition system IAS (in particular the spherical collimator SC) is preferably at least about 1 m. As the preform image is focalized at infinity, the cylindrical block CB receives substantially collimated rays from every source point. This advantageously allows to reduce astigmatism due to the cylindrical block CB. According to an embodiment of the present invention, the spherical collimator SC may comprise a first and a second achromatic doublets A1, A2. Optionally, the achromatic doublets A1, A2 may reduce the preform image by a factor 0.75 both in the x direction and in the y direction in order to minimize vignetting introduced by the cylindrical block CB.

Aberrations due to the cylindrical block CB may be further reduced by inserting an iris IR between the spherical collimator SC and the cylindrical block CB, which iris filters the paraxial rays (i.e. the farthest rays from the system axis).

The cylindrical block CB is adapted to reduce the size of the received preform image along the y direction while leaving unchanged the size of the received preform image along the x direction. Preferably, the reduction factor is chosen so that the aspect ratio of the preform image at the output of the cylindrical block CB is as close as possible to 1. The optimal value of the reduction factor then depends on the aspect ratio of the image received by the cylindrical block CB. For instance, in the embodiment of FIG. 3, the cylindrical block CB comprises a first and a second cylindrical lenses C1, C2 (i.e. lenses curved along the y direction only).

The spherical magnifier SM is adapted to magnify the received preform image by the same factor (e.g. 2.5) both along the x direction and along the y direction, and is also adapted to focalize the preform image at infinity so that the digital acquisition device DAD receives collimated rays. For instance, in the embodiment of FIG. 3 the spherical collimator SM comprises a third and a fourth achromatic doublets A3, A4.

It has to be noticed that, when using the above described optical system OS for manipulating an image of a cylindrical body with a y-oriented axis, such as the glass core preform C, a further magnification occurs in the x direction which is due to the fact that the body surface is curved in the x direction. The magnification factor of this further magnification mainly depends on the body refractive index. For instance, in case of a glass core preform (refractive index≈1.46), such a magnification factor is equal to about 1.46.

Table I comprises some optical features (in particular, nominal and effective focal lengths and diameter) of the optical elements used by the Applicant for performing a test by using the optical system OS shown in FIG. 3. All the optical elements are produced by the company Linos, located in Göttingen, Germany.

TABLE I

| reference numeral | serial number | Nominal focal length (mm) | Effective focal length (mm) | diameter/size (mm) |
|---|---|---|---|---|
| A1 | 06 3130 | 30 | 30.24 | 12.5 |
| A2 | 06 3127 | 40 | 40.18 | 18 |
| IR | 06 1651 | — | — | — |
| C1 | 06 3421 | 10 | 9.67 | 18 × 10 |
| C2 | 06 3422 | 40 | 40.31 | 18 × 15 |
| A3 | 06 3125 | 50 | 50.07 | 18 |
| A4 | 06 3122 | 20 | 20.70 | 10 |

By locating a glass core preform C at a distance d=1080 mm from the first achromatic doublet A1 and taking into account that the focal length of the video camera lens was 50 mm, magnifications due to the optical system OS are the following:

magnification along x direction: $mx=8.70 \cdot 10^{-2}$; and
magnification along y direction: $my=2.08 \cdot 10^{-2}$.

Since the body under measurement is a glass cylindrical body, a further magnification of 1.46 has to be considered in the x direction. Therefore, the effective magnification in the x direction is $mx'=mx \cdot 1.46=12.70 \cdot 10^{-2}$.

Therefore, the preform image Cl is reduced in both directions x and y in comparison with the preform C, and the aspect ratio Lx'/Ly' of the image Cl is increased by a factor equal to mx'/my≈6 in comparison with the aspect ratio Lx/Ly of the preform C. For instance, by assuming Ly=50 cm and Lx=7 cm, the sizes of the preform image Cl are the following:

$Lx'=Lx \cdot mx'=7 \text{ cm} \cdot 12.70 \cdot 10^{-2}=8.9$ mm; and
$Ly'=Ly \cdot my=50 \text{ cm} \cdot 2.08 \cdot 10^{-2}=10.4$ mm.

The output aspect ratio is Lx'/Ly'=8.9/10.4=0.86.

In FIG. 3, the preform C, the preform image Cl and the various optical elements of the optical system OS are not represented in scale.

The preform image Cl is acquired by the digital acquisition device DAD. Resolutions of the measurement apparatus MA along the x and y directions may be derived by the magnifications mx', my and by the pixel sizes dx, dy of the digital acquisition device DAD as follows:

resolution along the x direction: Rx=dx/mx'; and
resolution along the y direction: Ry=dy/my.

By assuming that the digital acquisition device DAD is the above cited digital video camera, each pixel has the following sizes: dx=4.4 μm and dy=4.4 μm. Therefore, the resolution in the x direction is $Rx=dx/mx'=4.4 \text{ μm/Pixel}/12.70 \cdot 10^{-2}=0.035$ mm/pixel, while the resolution along the y direction is $Ry=dy/my=4.4 \text{ μm/pixel}/2.08 \cdot 10^{-2}=0.212$ mm/pixel. Then, the obtained resolution Rx=0.035 mm/pixel in the x direction is suitable for measuring the axial hole diameter of a glass core preform during the measuring step 12a, since the minimum value allowed for the axial hole diameter is about 0.05 mm.

Figure 4:
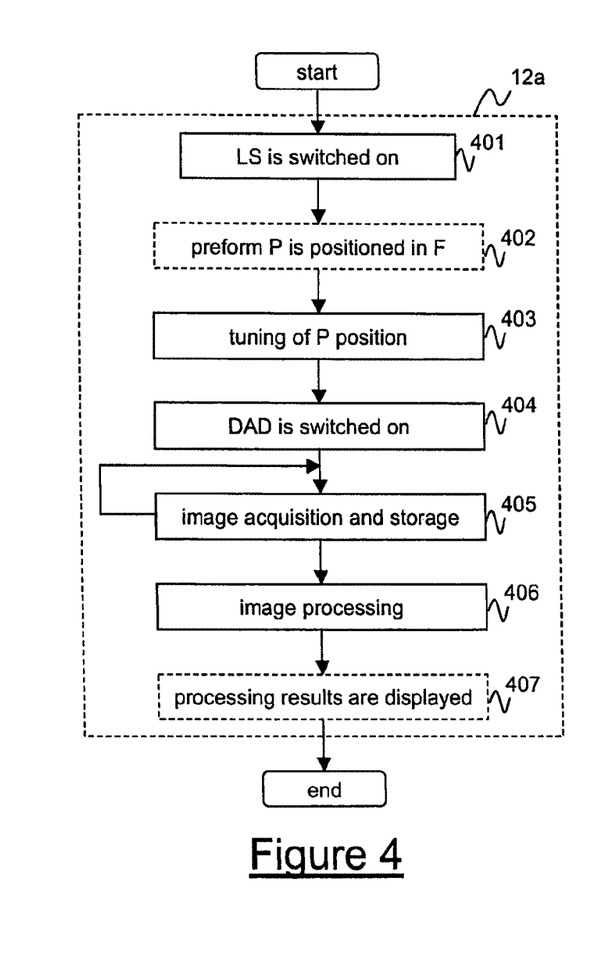
FIG. 4 schematically shows a flow chart of an exemplary operation of the measurement apparatus of FIG. 2.

FIG. 4 schematically shows a flow chart of an exemplary operation of the measurement apparatus of FIG. 2 for executing the measuring step 12a.

In FIG. 4, it is assumed that the glass core preform C to be measured is a "cold" preform, i.e. the measuring of the preform axial hole geometric characteristics is performed when the glass core preform has already been extracted from the furnace. In order to start the measuring step 12a, the light source LS is turned on (step 401). Then, the glass core preform C to be measured is positioned into the measuring apparatus MA (step 402) by hanging it up through its handle to the hook H of the frame F. Optionally, step 402 can be performed before step 401. Successively, the preform C and the light source LS are reciprocally aligned (step 403). Step 403 may be performed by moving the preform C while keeping the light source LS fixed, or vice versa. Alternatively, step 403 can be performed by moving both the preform C and the light source LS. Preferably, this step can be performed by using the above mentioned graphic interface of the processing unit PU, which may allow to obtain a preview of the image of the glass core preform C illuminated by the light source LS and also to command movements of the preform C and/or the light source LS. After step 403, the digital acquisition device DAD is turned on (step 404). Step 404 may be performed through the graphic interface.

Then, the image Cl of the glass core preform C is digitally acquired by the digital acquisition device DAD, and digital data corresponding to the acquired image are transferred to the processing unit PU (step 405). After step 405, the operator may decide whether to store the acquired image in a memory device of the processing unit PU or to delete it.

If a further image has to be acquired, step 405 is repeated. For instance, the operator may decide to acquire a new image since the first acquired image is not sufficiently clear.

Alternatively, a sequence of different images may be acquired while rotating the preform around its longitudinal axis by a given angle between two successively acquired images. This can be useful for evaluating asymmetries of a glass core preform (and in particular of the glass core preform axial hole) since a preform has only theoretically a rotational symmetric shape. In particular, a preform generally has an elliptic section whose shape may vary along the preform axis.

Moreover, the axis of a preform is generally curved. Therefore, different images at different angles may be useful for evaluating irregularities of the preform shape.

Once stored, an operator may select the stored image(s) to be processed. The selected image is processed by the processing unit PU for measuring the desired geometric characteristics of the preform C (in particular of the glass core preform axial hole) (step 406), as it will be described in greater detail herein after.

Preferably, the selected image CI and the processing results are displayed through the graphic interface of the processing unit PU (step 407). Alternatively, the processing results may be stored into the memory device of the processing unit PU and they can be retrieved at a later time for being displayed or for being further processed.

At the end of step 407, the measuring step 12a can be considered to be completed and the operator has measured all the geometric characteristics of the glass core preform axial hole so that he can decide whether or not to proceed with the stretching of the glass core preform C.

Moreover, in the case the measured values are not conform with the desired ranges of the geometric characteristics, the operator may decide which parameters of the further thermal treatment step have to be modified and how to modify them in order to obtain measured values that are in conformity with the above mentioned desired ranges.

Figure 5:
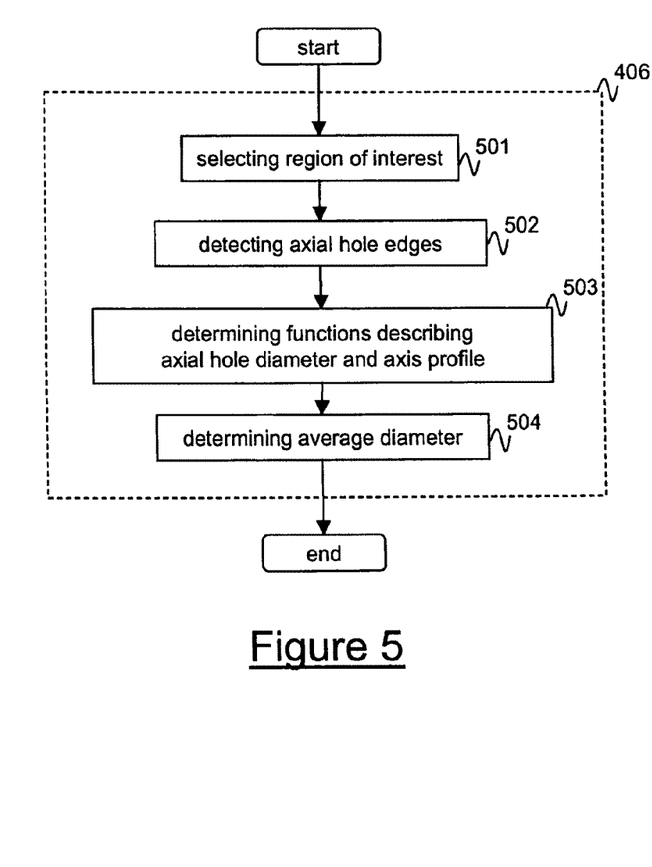
FIG. 5 schematically shows a flow chart referring to the step of processing a digital image of a glass core preform which is acquired by the measurement apparatus of FIG. 2, and FIGS. 6a and 6b show exemplary curves representing the results of the step of processing which are performed according to the flow chart of FIG. 5.

FIG. 5 schematically shows a detailed flow chart of the step 406 of FIG. 4, i.e. of the step of processing a digital image CI of a glass core preform C acquired by the measurement apparatus of FIG. 2.

The processing step 406 starts with a step 501 according to which a region of interest is selected within the acquired image to be processed. For instance, it could be desirable to exclude from the region of interest the preform end portions. Selecting the region of interest may be manually performed by the operator through the graphic interface. Alternatively, selecting the region of interest may be automatically performed by the processing unit according to predefined parameters selected by the operator. Therefore, within the region of interest, the axial hole edges are detected (step 502). Step 502 may be performed by means of any known algorithm for detecting edges in a digital image. For instance, but not exclusively, it is possible to use the Canny technique, which will be briefly summarized in the following. The Canny technique is based on the assumption that higher intensity gradient pixels (i.e. pixels whose intensity is most different from the intensity of adjacent pixels) are likely to be edge pixels.

Then pixels with the highest intensity gradient are detected and grouped in clusters, according to their reciprocal distance, and the clusters are successively sorted according to the number of pixels they contain. Then, it is assumed that the two clusters with the highest number of pixels correspond to the two axial hole edges.

Upon determination of the two clusters corresponding to the two axial hole edges, an analytic curve is determined (for instance, but not exclusively, a polynomial curve, whose order can be selected either manually by the operator or automatically by the processing unit PU), which describes the desired geometric characteristics (step 503). For instance, an analytic curve $dh(y)$ may be determined which describes the axial hole diameter as a function of the position along the y direction. Similarly, an analytic curve $ap(y)$ may be determined which describes the axis profile as a function of the position along the y direction. In case such curves $dh(y)$, $ap(y)$ are polynomial curves, step 503 substantially comprises determining two respective sets of polynomial coefficients.

Figure 6A:
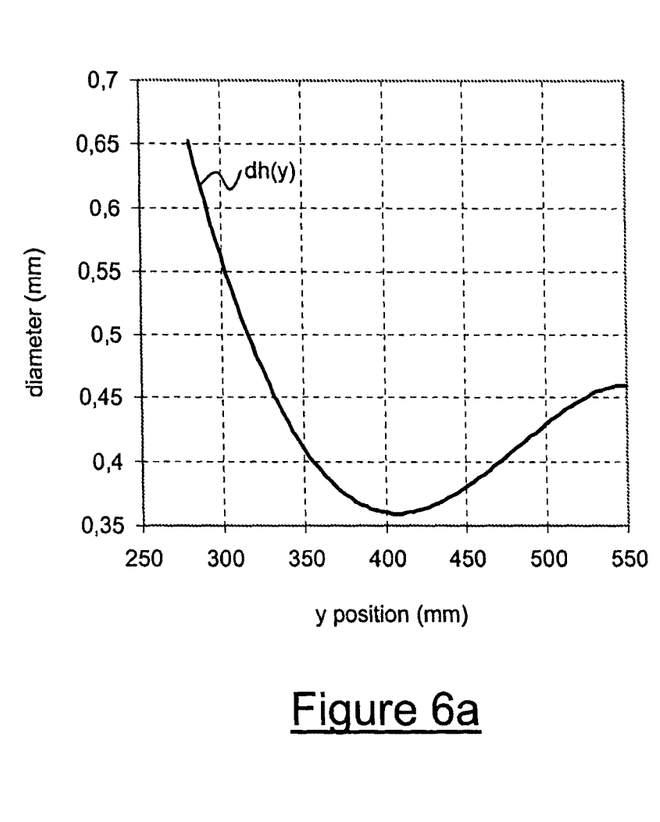
Figure 6B:
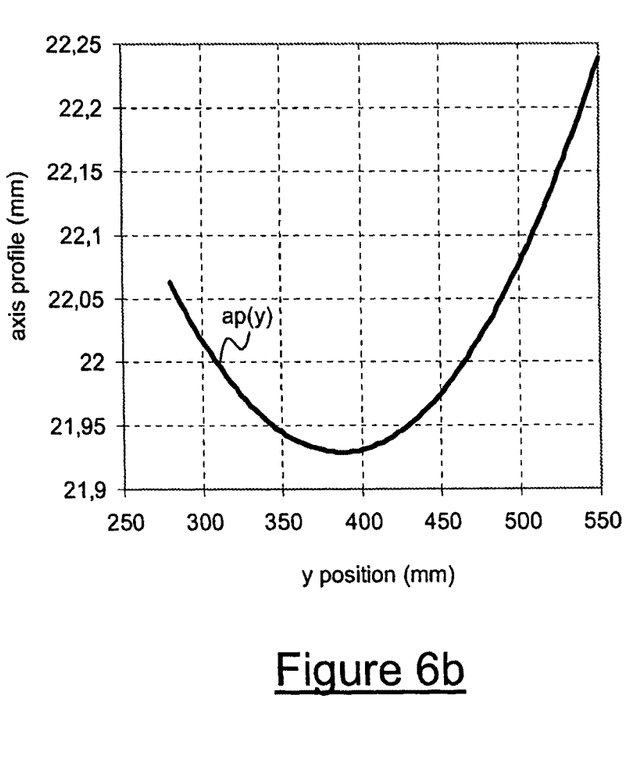

FIGS. 6a and 6b show exemplary curves $dh(y)$ and $ap(y)$, respectively, determined by performing the above step 503 of FIG. 5.

In particular, FIG. 6a shows an exemplary polynomial curve $dh(y)$ that describes the axial hole diameter versus the position along the y direction. The order of the polynomial curve $dh(y)$ is 4. In this exemplary curve, the axial hole diameter decreases from the ends of the preform to the central part of the preform so that only a central portion of the preform (which is comprised roughly between a first position at 350 mm and a second position at 470 mm) has an axial hole diameter lower than 0.4 mm, which is the maximum value above which the axial hole of the glass core preform will rewet after drying and consolidation, thus generating an optical fiber with a non negligible attenuation peak between 1330 nm and 1470 nm. Therefore, the glass core preform with the axial hole diameter shown in FIG. 6a will be stretched to form a core cane, but only a central portion of the core cane will undergo successive steps of the process for manufacturing an optical fiber.

FIG. 6b shows an exemplary polynomial curve $ap(y)$ that describes the axis profile of the glass core preform axial hole versus the position along the y direction. The order of the polynomial curve $ap(y)$ is 3. In this exemplary curve, the axis profile is "U" shaped, i.e. the axis of the glass core preform axial hole is not rectilinear. The maximum shift of the axis is about 0.3 mm, occurring between a first position at about 390 mm (which roughly corresponds to the middle point of the preform) and a second position at about 550 mm (which roughly corresponds to an end of the preform). Generally, the axis profile of the glass core preform axial hole coincides with the axis profile of the glass core preform.

Referring to FIG. 5, after the above step 503, average measurements can be obtained from the curves of FIGS. 6a, 6b (step 504). For instance, the curve of FIG. 6a allows to obtain an average value of the axial hole diameter. According to such an average value, it is possible to decide whether to subject the obtained glass core preform C to further processing or not.

Therefore, the present invention advantageously allows to determine downstream from the drying and consolidating step, and in particular immediately after the axial hole diameter reduction, whether the drying and consolidating step has been successfully carried out. In the affirmative, the glass core preform may be stretched and further processed according to any conventional manner. In the negative, the preform (or a portion thereof) can be discarded at a very early stage of the optical fiber manufacturing process without the need of completing the optical fiber manufacturing process.

Moreover, the measuring step according to the present invention provides for very high resolution results. Furthermore, the measuring step can be quickly performed so that the optical fiber manufacturing process is not delayed. Furthermore, the measuring step is easy to be carried out so that it can be performed by non specialized technicians.

A further advantage of the present invention is that the measuring step is non-invasive so that the glass core preform properties are not negatively affected. This enables to make the test on glass core preforms which are subsequently used in the production, so that a significant part of production, or the whole thereof, can be monitored.

The invention claimed is:

1. A process for manufacturing an optical fiber, comprising:
   producing a soot core preform by depositing a core material on a substrate;
   removing said substrate from said soot core preform;
   drying and consolidating the soot core preform so as to obtain a glass core preform having an axial hole;
   reducing a diameter of said axial hole;
   stretching said glass core preform so as to substantially close said axial hole; and
   measuring at least one geometric characteristic of said axial hole of said glass core perform;
   wherein the measuring step comprises acquiring a first image of a whole glass core preform having a first aspect ratio and optically compressing said first image in a first direction parallel to a longitudinal axis of the glass core preform so as to obtain a second image having a second aspect ratio different from said first aspect ratio.

2. The process according to claim 1, wherein the measuring step is carried out before the stretching step.

3. The process according to claim 1, wherein the measuring step further comprises a step of measuring the at least one geometric characteristic along the whole length of said axial hole.

4. The process according to claim 3, wherein the measuring step comprises measuring a diameter of said axial hole.

5. The process according to claim 3, wherein the measuring step comprises measuring an axis profile of said axial hole.

6. The process according to claim 5, wherein the measuring step comprises a step of plotting said axis profile of said axial hole.

7. The process according to claim 3, wherein the measuring step comprises a step of illuminating the glass core preform.

8. The process according to claim 1, wherein the measuring step is performed while the glass core preform is positioned inside a furnace for performing the drying and consolidating step.

9. The process according to claim 1, wherein the measuring step is performed while the glass core preform is positioned outside a furnace for performing the drying and consolidating step.

10. The process according to claim 1, wherein the reducing comprises a step a thermally treating the glass core preform.

11. The process according to claim 10, further comprising a step of adjusting at least one parameter of the thermally treating step.

12. The process according to claim 11, wherein the adjusting step is carried out after the measuring step.

13. The process according to claim 1, wherein the acquiring step comprises a step of acquiring said second image.

14. The process according to claim 13, wherein the acquiring step comprises a step of processing said second image so as to measure the at least one geometric characteristic of the axial hole of the glass core preform.

15. The process according to claim 14, wherein the processing step comprises the step of obtaining at least one analytic curve that describes said at least one geometric characteristic of the axial hole of the glass core preform.

16. The process according to claim 1, wherein the compressing step comprises a step of focusing said first image at infinity.

17. The process according to claim 16, wherein the compressing step comprises a step of filtering paraxial rays of the focused image.

18. The process according to claim 17, wherein the compressing step comprises a step of magnifying the filtered image in said first direction by a first magnification factor lower than 1.

19. The process according to claim 18, wherein the compressing step comprises a step of re-magnifying the magnified image both in the first direction and in a second direction perpendicular to said first direction by a second magnification factor higher than 1.

20. The process according to claim 19, wherein the compressing step comprises a step of -re-focusing the re-magnified image at infinity so as to obtain said second image.

21. The process according to claim 1, wherein said second aspect ratio is between 0.7 and 1.3.

22. The process according to claim 1, wherein the acquiring step is performed more than one time so as to obtain at least one further image different from said first image of the glass core preform.

23. The process according to claim 22, further comprising the step of rotating the glass core preform before acquiring said at least one further image.

24. A method for measuring at least one geometric characteristic of a glass core preform comprising the following steps:
   illuminating said glass core preform;
   acquiring a first image of the whole glass core preform having a first aspect ratio;
   optically compressing said first image in a first direction parallel to a longitudinal axis of the glass core preform so as to obtain a second image having a second aspect ratio different from said first aspect ratio;
   acquiring said second image; and
   processing said second image so as to measure said at least one geometric characteristic.

25. The method according to claim 24, wherein the optically compressing step comprises a step of focusing said first image at infinity.

26. The method according to claim 25, wherein the optically compressing step comprises a step of filtering non-collimated rays of the focused image.

27. The method according to claim 26, wherein the optically compressing step comprises a step of magnifying the filtered image in said first direction by a first magnification factor lower than 1.

28. The method according to claim 27, wherein the optically compressing step comprises a step of re-magnifying the magnified image both in the first direction and in a second direction perpendicular to said first direction by a second magnification factor higher than 1.

29. The method according to claim 28, wherein the optically compressing step comprises a step of re-focusing the re-magnified image at infinity so as to obtain said second image.

30. The method according to claim 24, wherein said second aspect ratio is between 0.7 and 1.3.

* * * * *